Figure 1:
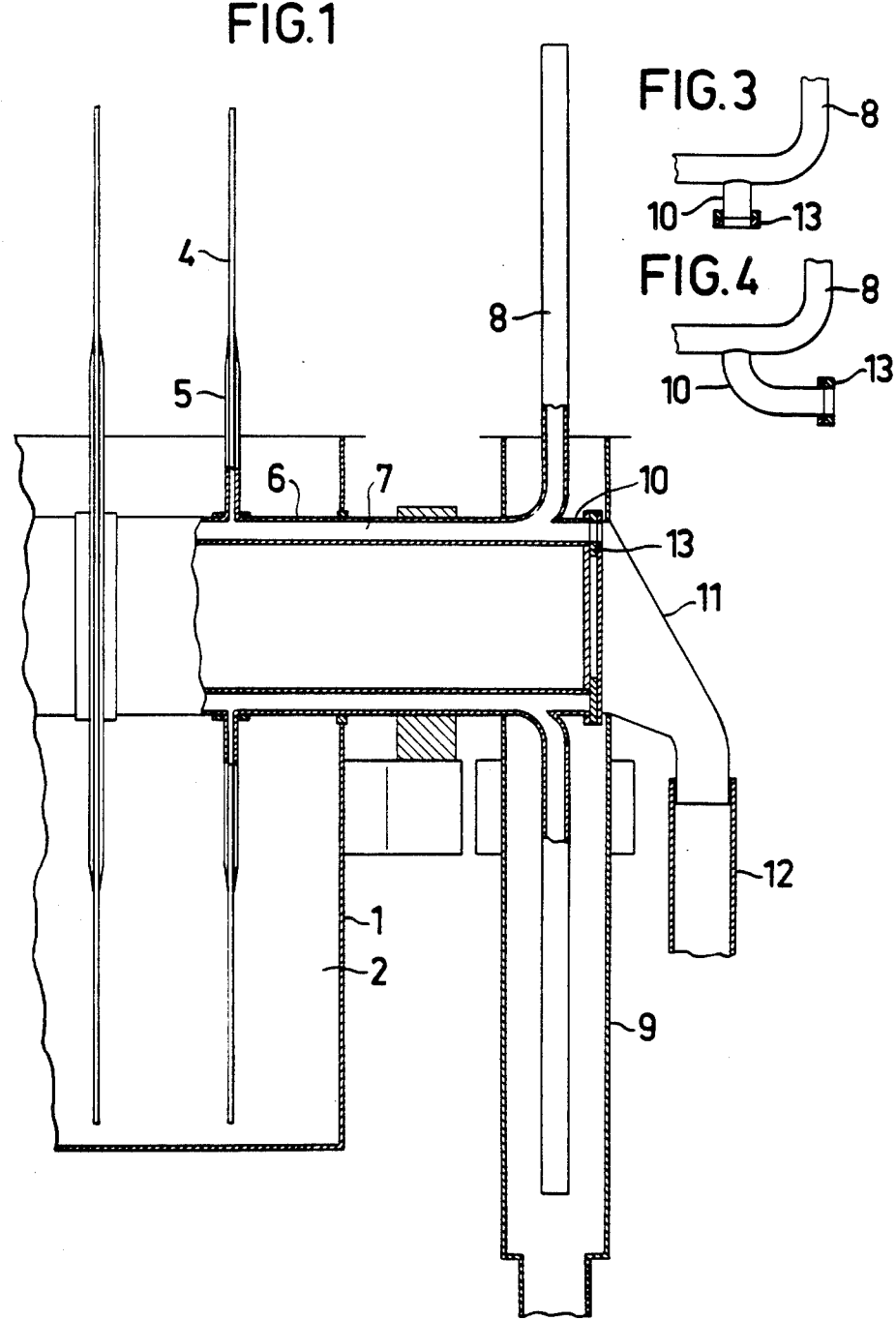

United States Patent [19]

Ragnegard

[11] Patent Number: 4,676,901
[45] Date of Patent: Jun. 30, 1987

[54] ROTATING DISC FILTER

[75] Inventor: Samuel Ragnegard, Hedemora, Sweden

[73] Assignee: AB Hedemora Verkstader, Hedemora, Sweden

[21] Appl. No.: 800,884

[22] Filed: Nov. 22, 1985

[30] Foreign Application Priority Data

Nov. 23, 1984 [SE] Sweden ................................. 8405901

[51] Int. Cl.⁴ ............................................. B01D 33/26
[52] U.S. Cl. ..................................... 210/331; 210/486
[58] Field of Search ..................... 210/322, 323.1, 324, 210/327, 330, 331, 486

[56] References Cited

U.S. PATENT DOCUMENTS 3,471,026 10/1969 Riker .................................... 210/327
4,328,099 5/1982 Krappmann et al. ................ 210/330

Primary Examiner—Frank Sever
Attorney, Agent, or Firm—Pollock, Vande Sande & Priddy

[57] ABSTRACT

In a rotating disc filter for dewatering a suspension comprising filter discs (3) divided into a plurality of disc sectors (4), the discharge of filtrate from each disc sector takes place through an axial filtrate channel (7). Each filtrate channel is at the side wall of the filter connected to a fall pipe (8) which rotates with the channel and extends in radial direction relative to the filter shaft (6). Preferably each of said filtrate channels is at said side wall provided with a pre-filtrate outlet (10).

10 Claims, 9 Drawing Figures

ROTATING DISC FILTER

The present invention relates to a rotating disc filter for dewatering a suspension, preferably a fiber suspension.

Disc filters are common within, for instance, cellulose and paper industries for cleaning backwater and for thickening fiber suspensions. Such a filter consists of a horizontal shaft having axial channels ending in one end of the shaft and a number of filter discs mounted radially on the shaft, each disc consisting of a number of sectors each of which is connected to a respective channel in the shaft. The shaft and the discs are about 50% immersed into a trough containing the fiber suspension to be filtered. The end of the shaft, in which the channels issue, is connected to a so-called suction head which is usually continuous in a barometric fall pipe or is connected to a vacuum pump. When the shaft and the discs rotate in the trough, the fiber suspension is filtered therein through the filter discs owing to the pressure difference between the fiber suspension in the trough and the interior of the filter discs caused by the barometric fall pipe or the vacuum pump. A fiber layer is formed on the part of the discs immersed in the trough. In order to make the process continuous the fiber layers are removed from the disc sectors as they come up out of the trough so that they are free from fibers when they again are immersed into the trough.

A disc sector in known configuration usually consists of two decks of perforated plates joined with intermediate ribs at an appropriate distance from each other, so that internal filtrate channels are formed. About the outer periphery of the sector there are U-ledges and the inner periphery is connected to a funnel having a flange or a pipe for the connection to the disc filter shaft. A filter cloth, preferably in the form of a cloth bag made of shrinkable synthetic material, is arranged over the sector deck. The filter cloth is drawn over the sector and is then allowed to shrink so that it is tightly closed around the sector.

As the filtering process proceeds a successive blocking of the filter cloth takes place. In order to counteract this, the disc filter is provided with a spray which sprays the cloth clean after the fiber layer has been removed. Upon cleaning of a fiber-containing backwater on a disc filter, the filtration occurs first through the clean-sprayed filter cloth but as the filtering cycle proceeds a fiber layer is formed on the filter cloth. Hereby, the filtrate will become successively cleaner during the filtering cycle since the filter medium becomes more and more impermeable by the build-up of fibers. The filtrate flow is divided up in the suction head of the filter so that two filtrates are discharged, one so-called pre-filtrate from the beginning phase or period of the filtering cycle and one so-called clear filtrate.

Since vacuum pumps are expensive in installation and operation, the most commonly existing device for creating required pressure difference over the filter is a barometric fall pipe. The length of a fall pipe must be at least 6–8 m completely vertical length. This means that the filter has to be positioned at such a height in the plant that this fall height is provided. The positioning of the filter will thereby many times determine the height of the required building for the actual plant, which means a more expensive plant. The flows over the filter are often of the magnitude of 30–70 $m^3$/min. and these flows must be pumped up to the filter. The flow velocity in the barometric fall pipe is relatively high, which implies that a great quantity of air thereby is mixed into the filtrate which demands sufficient volume for de-airing of the filtrate before it can be recirculated in the process.

Filters with separate co-rotating fall pipes for each filter cell or channel are previously known, particularly concerning drum filters, so-called valve-free filters. It is common for these known filter constructions for the fall pipes to extend from an outer periphery inwardly towards the interior of the filter where a water-lock is arranged for a part of the rotation revolution by the fact that the filtrate being discharged from the fall pipes reaches a level within the filter before it flows out of the filter. The construction results in a limitation of the length of the fall pipes by the available space within the filter, which in turn depends on the size of the filter. Since the pressure difference created over the filter among other things is a function of the length of the fall pipe this fact is a definite disadvantage.

The present invention eliminates completely the need of either a vacuum pump or a barometric fall pipe of the above-mentioned kinds, and diminishes thereby in a high degree the height of the plant. Moreover, a result of the invention is that the flow takes place more calmly resulting in less air mixed into the filtrate, whereby the volume of the filtrate container can be made smaller.

According to the invention each filtrate channel in the filter shaft is connected to a corresponding co-operating fall pipe, which establishes the pressure difference over the filter required for the filtration, and the fall pipes from the filtrate channels extend substantially radially outwardly towards the filter periphery and possibly past the filter periphery. Preferably, the filtrate channels are at the side wall of the filter, and, in addition to the fall pipes, are provided with a further outlet, a pre-filtrate outlet.

This pre-filtrate outlet operates immediately when corresponding sector row immerses into the suspension in the filter trough. The fall pipe for the sector row in question is then in a position where its outlet is above the level in the trough and thus has not come into operation. Apart from a previously known filter construction having co-operating fall pipes, this means that the filtrate from the first part of the filter cycle does not need to be accumulated in the cells and channels of the filter until the fall pipe comes into such position that it comes into operation, but the filtrate starts to flow out of the filter immediately from the beginning of the filter cycle. The cells and channels of the filter accordingly do not have to be dimensioned with extra volume for accumulated filtrate but can be made just for the dimensions and volumes required for obtaining an effective outflow. Possibilities have hereby been created to effectively separate a first turbid filtrate, the so-called pre-filtrate, from thereafter following clearer filtrate, which is of great importance for instance when the filter is used for cleaning backwater from paper machines.

Tests have proved that 20–30% of all filtrate amount can be discharged as pre-filtrate whereupon remaining amount clear filtrate has a purity completely comparable with the purity obtained from previously known filter constructions having long barometric fall pipes.

By the fact that the complete filter cycle is used for draining the filter, also the hydraulic capacity of the filter is positively effected. Another advantage with a further outlet besides the fall pipe from the filtrate channel is, that hereby is made possible a better use of the advantage that the fall pipes can be made with a required length without the limitation existing in known filter constructions in such a way, that a shorter drainage cycle of a longer fall pipe is compensated by a corresponding longer cycle of the pre-filtrate outlet.

Figure 2:
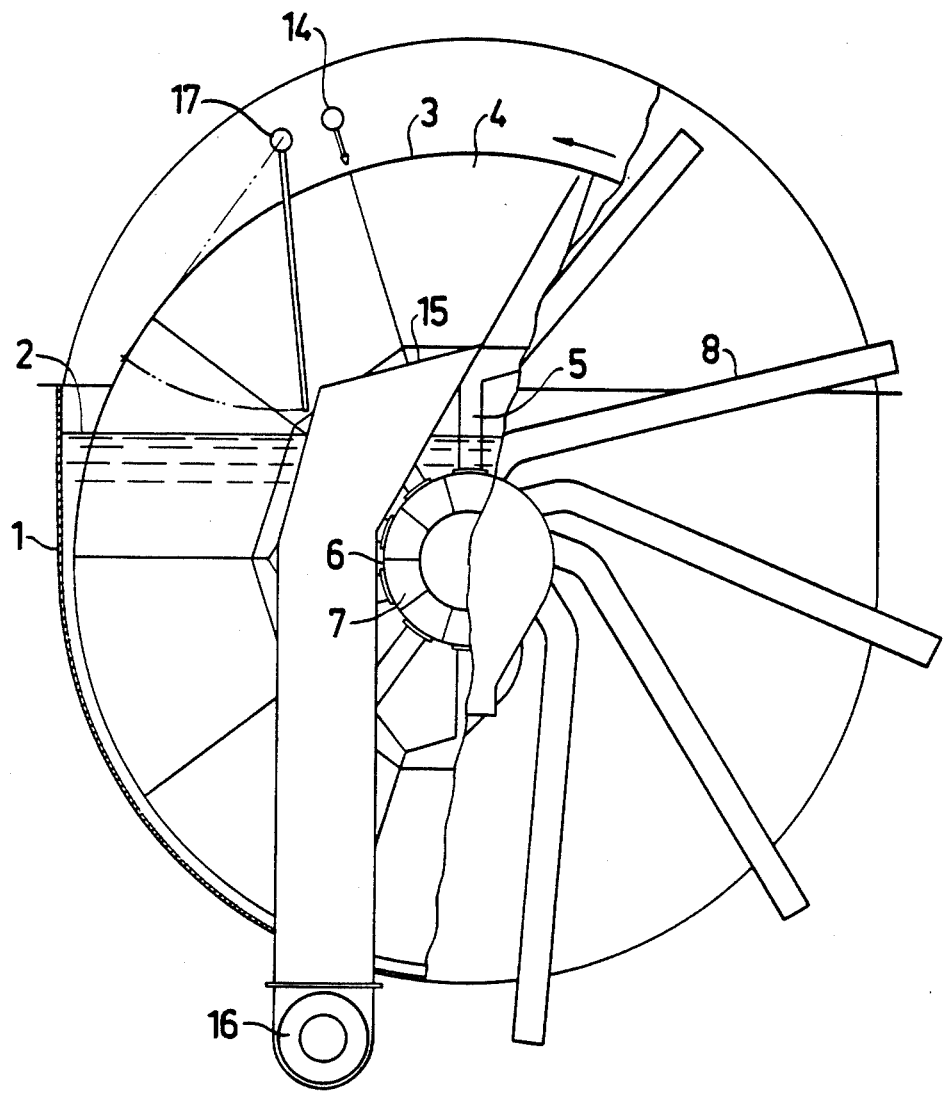
Figure 5:
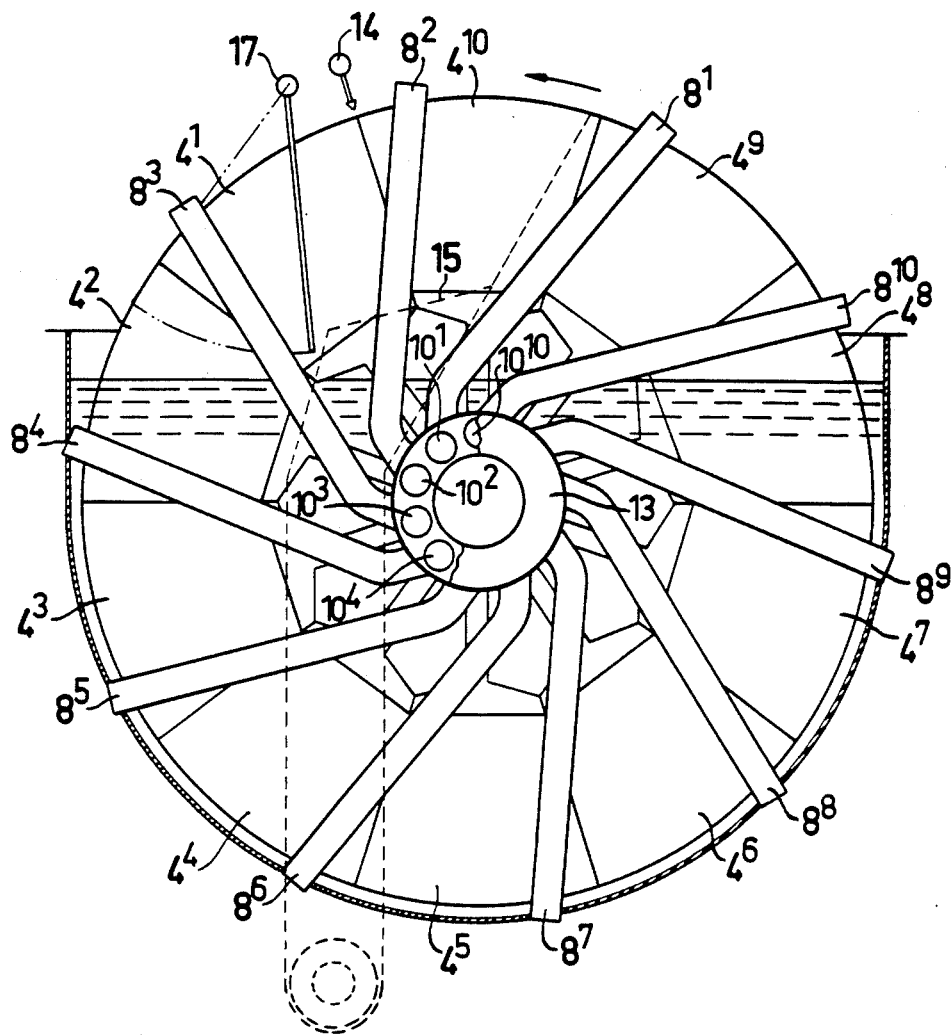
Figure 6:
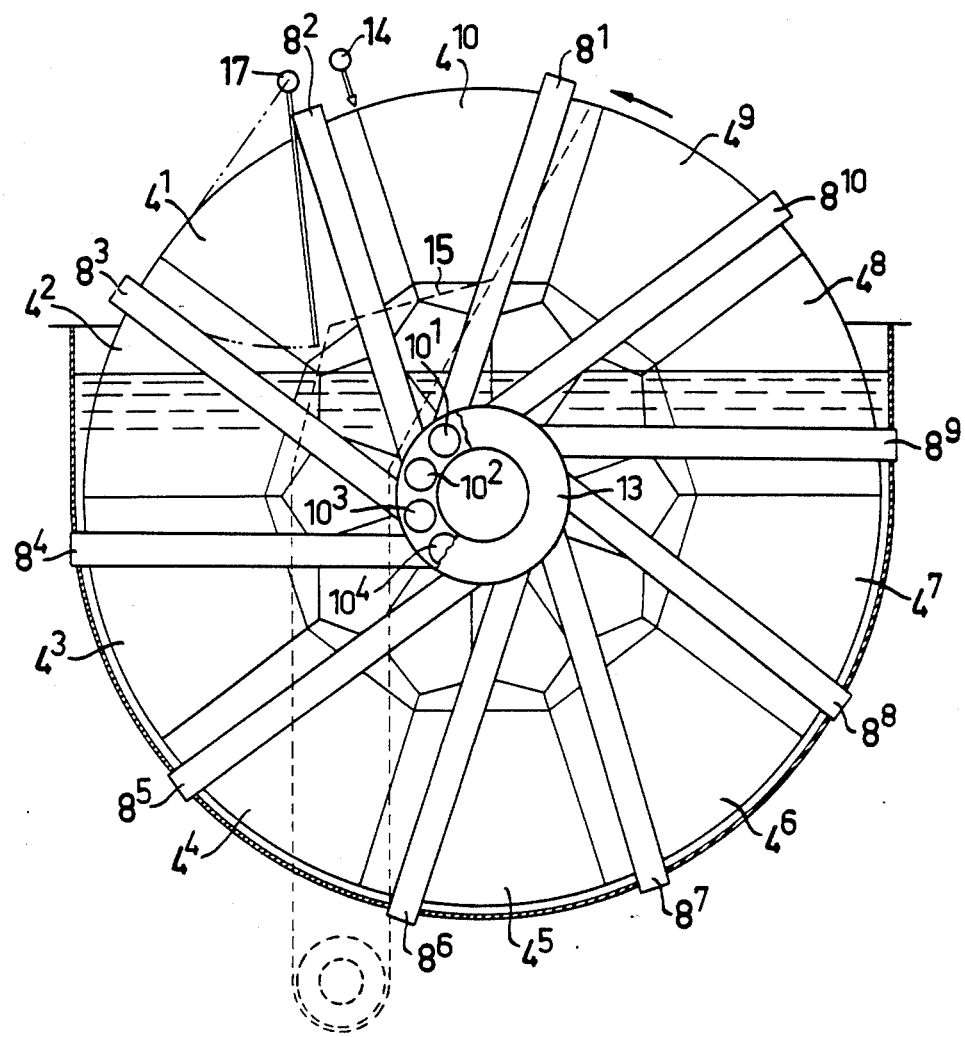
Figure 7:
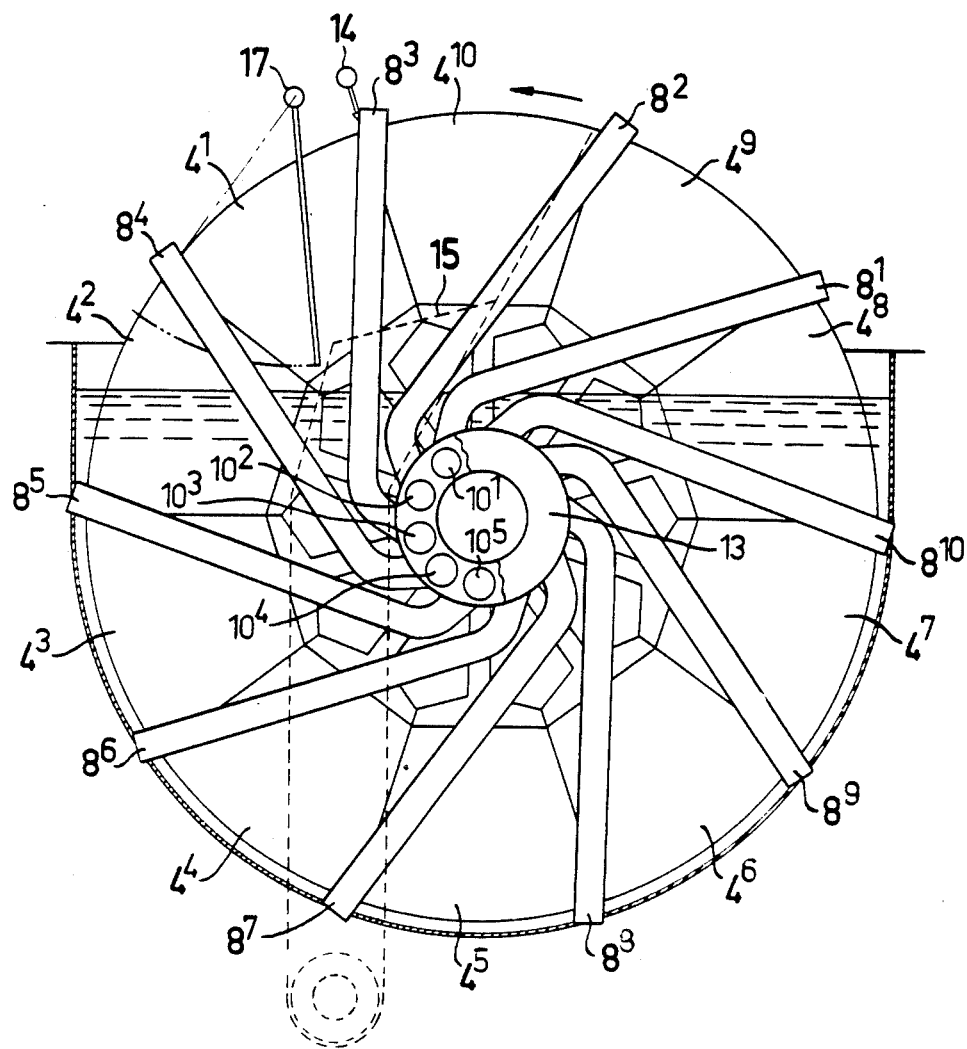
Figure 8:
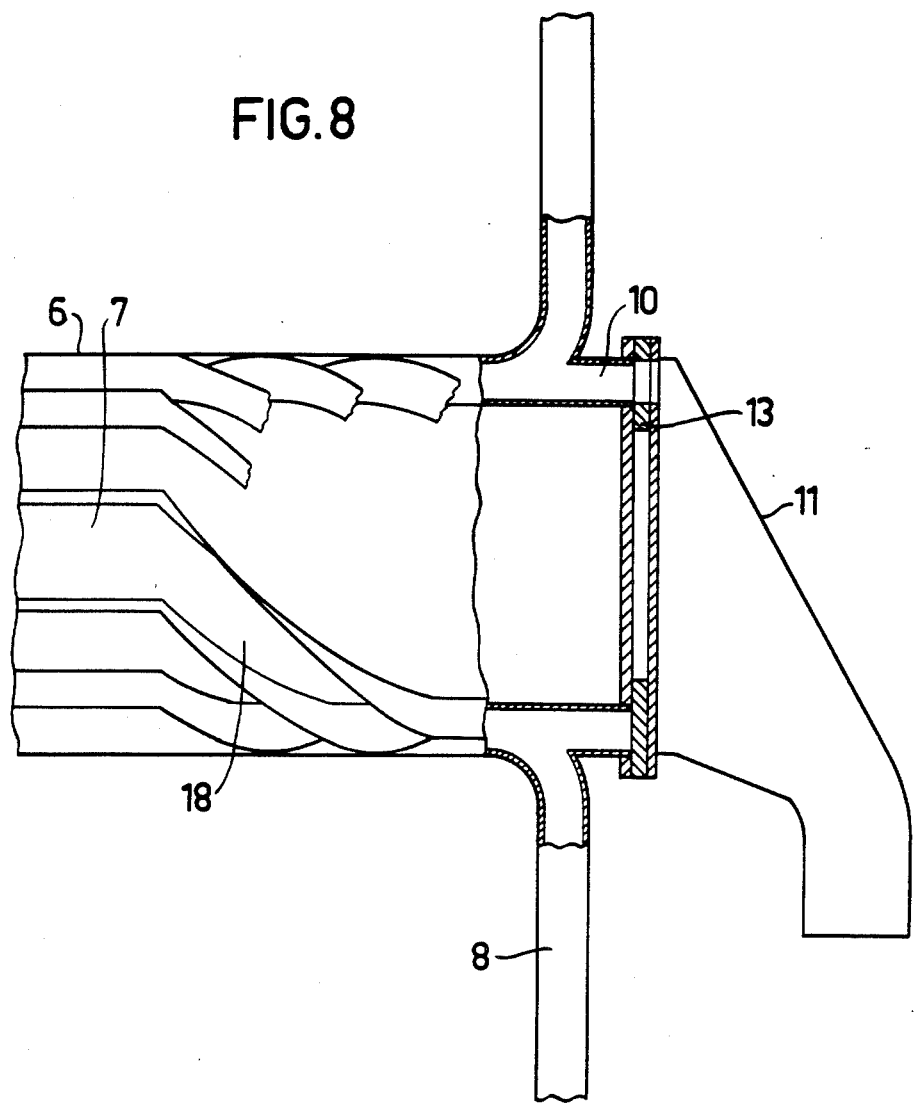
Figure 9:
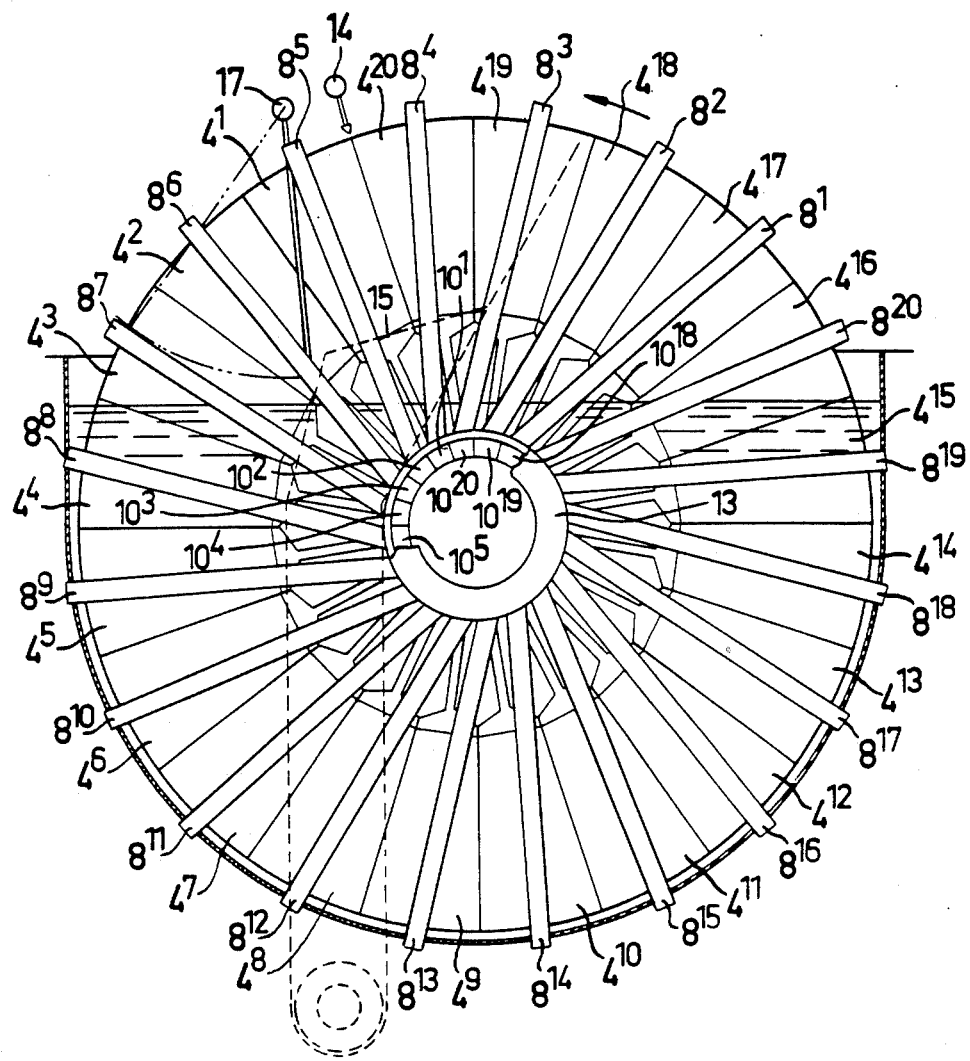

Preferred embodiments of the invention are in the following described more in detail with reference to the accompanying drawings, wherein FIG. 1 is a side view of an end portion of a disc filter according to the invention, partly shown in a central section, FIG. 2 is an end view of the filter shown in FIG. 1, partly cut off, FIGS. 3 and 4 show alternative embodiments of a detail in the filter shown in FIG. 1, FIG. 5 illustrates schematically how the invention operates in a preferred embodiment, FIGS. 6 and 7 illustrate schematically how the invention operates in alternative embodiments, FIG. 8 is a view corresponding to FIG. 1 and shows an alternative disc filter according to the invention, and FIG. 9 illustrates schematically how the invention operates in an embodiment shown in FIG. 8.

FIG. 1 shows a side view of a disc filter according to the invention, partly in section, and FIG. 2 an end view of the same filter up to an appropriate level, partly cut off. A trough 1 is filled with a suspension 2 to be filtered. A plurality of filter discs 3 positioned in parallel with each other along a shaft 6 rotate, as shown with an arrow, within the trough 1. Each filter disc consists of a plurality of disc sectors 4 with surrounding filter cloth and interior space for filtrate. A pipe 5 guides the filtrate from the sector to corresponding channel 7 in the shaft 6 for further transport to one end of the shaft. Each channel 7 is at the shaft end connected to a corresponding co-rotating fall pipe 8. Pipes 8 are arranged for creating the negative pressure in the sectors required for the filtration. The filtrate flowing in the fall pipes is discharged into a funnel 9 and flows therefrom down into a filtrate cistern (not shown). A further connection 10 functions as outlet, pre-filtrate outlet, when the fall pipe is in such position that discharge does not take place that way. The pre-filtrate outlets issue in a funnel 11 from which the filtrate flows down into the filtrate cistern through a pipe line 12. An automatic shut-off device 13 is positioned in the mouth of the pre-filtrate outlets and this shut-off valve closes the pre-filtrate outlet when corresponding fall pipe is in such a position that the filtrate flows through the fall pipe and opens when the fall pipe has another position. This function will be described more in detail in connection with FIG. 5. FIGS. 3 and 4 show alternative embodiments for the connection of the filtrate channel to fall pipe and pre-filtrate outlet. A device for removing the filter cake, for instance a water spray 14, is also shown in FIG. 2. The filter cake falls down into a funnel 15 leading to a screw conveyor 16 for the transport of the fibers. A further liquid spray 17 washes the filter cloth clean before the sector again immerses into the suspension.

FIG. 5 illustrates schematically a filtering process according to the invention. The level of the suspension bath is marked with dashed lines and the rotation direction of the filter is shown with an arrow.

Sector $4^2$ is sprayed clean by the cloth spray 17 and is on its way down into the suspension in the filter trough where it becomes filled with filtrate. Corresponding fall pipe $8^2$ is in such a position that the filtrate can not flow out that way. Instead, the pre-filtrate outlet $10^2$ begins to come into function owing to the hydrostatic pressure that is created by the height difference between the suspension level and the pre-filtrate outlet. As the sector immerses deeper into the suspension, a fiber layer is built up on the sector surface which increases the filtration resistance at the same time as the hydrostatic pressure height increases and balances the increased filtration resistance. When the sector is in position $4^3$ the outlet of the fall pipe $8^3$ is still in a position higher than the suspension level in the filter trough. Between position $8^3$ and $8^4$ the outlet of the fall pipe arrives at a position lower than the level in the filter trough and begins to function at the same time as the pre-filtrate outlet $10^4$ begins to be closed by the closure device 13. In position $10^5$ the pre-filtrate outlet is completely closed and all filtrate is discharged via the fall pipe $8^5$. As the filtration cycle proceeds the filtration resistance increases but at the same time the fall pipe takes a more and more vertical position which increases the effect thereof. In position $4^8$ the sector is on its way up out of the suspension at the same time as the fall pipe in the position $8^8$ still has a favourable direction. From position $4^8$ and to position $4^{10}$ a drainage of the sector takes place so that it is emptied from filtrate when the jets of the removing spray hit the sector in position $4^{10}$ where the filter cake is removed and falls down into the funnel 15. In the embodiment shown in FIG. 5 the outlet of the fall pipe $8^{10}$ is positioned in level with a horizontal line from the lowest point on the filter surface of the sector $4^{10}$, whereby conditions have been created for the sector to be completely emptied up to position $4^{10}$. In order to further promote the emptying of the sector the closure device 13 opens so that filtrate also flows through the outlet $10^{10}$. The closure device 13 is adjustable so that correct position for opening and closing can be set up to fit existing applications.

FIG. 6 shows an alternative embodiment where the mouth of the fall pipe in position $8^{10}$ is positioned 15 degrees of the rotation revolution above a horizontal line from the lowest point on the filter surface of the sector $4^{10}$, at the same time as the closure device 13 completely closes outlet $10^{10}$. The effect is in this case, that remaining filtrate in the fall pipe flows back and causes a compression of the air in the sector, whereby the removal of the filter cake is made easier. This embodiment can be advantageous in those cases when the filter cake is difficult to remove only by the removing spray. This, however, takes place to the detrimental of a lower capacity of the filter owing to the fact that the different positions of the fall pipes through the filtration cycle become less favourable than in the embodiment according to FIG. 5.

Another effect of this embodiment, particularly when the filter with high velocity rotates, is that filtrate still remains in the sector in position $4^{10}$, whereby re-wetting of the removed filter cake takes place. An embodiment with more than 20 degrees is unsuitable.

FIG. 7 shows another alternative embodiment, in which the outlet of the fall pipe in position $8^{10}$ is positioned 30 degrees of the rotation revolution below a horizontal line from the lowest point on the filter surface of the sector $4^{10}$, at the same time as the closure device 13 completely closes outlet $10^{10}$. The effect is in the case, that the fall pipe is in a better position for creating a favourable vacuum when the sector is in the positions above the suspension and is drained. The dry content of the filter cake increases hereby and the risk for re-wetting of the filter cake at the removal thereof increases also at high velocities of the filter. Also in this case the capacity of the filter becomes lower. A degree number down to 40 degrees of the rotation revolution below a horizontal line from the lowest point on the filter surface of the sector $4^{10}$ can be of interest in certain applications.

In the embodiments of the invention shown in FIGS. 5-7 each filter disc has 10 sectors. Certain applications may require a larger number of sectors per filter disc. This is for instance the case when highest possible concentration of the filter cake is pursued and when washing of the filter cake shall take place on the filter. Also the hydraulic capacity of the filter is favourably influenced by a large number of sectors per disc. For instance in cellulose and paper industries it is common to have disc filters with up to 20 sectors per filter disc. In those cases when the number of sectors per filter disc is larger than 10, particularly 15-20, and accordingly there are a corresponding number of channels in the filter shaft, it can be difficult to make the construction of the shaft and connected fall pipes as shown in FIGS. 5-7, since there will be little space between the fall pipes, if the diameter of the filter shaft at the same time shall be kept at a reasonable level, that problems arise in placing the fall pipes in a required manner and in required directions. The same problem arises when the capacity of the filter and accordingly the amount of filtrate is above a certain magnitude, say 20-30 m³/min, resulting in larger dimensions for the channels and the fall pipes. FIG. 8 illustrates a suitable embodiment for these cases and illustrates an end portion of the filter shaft 6 with channels 7. The filter discs are positioned to the left outside the Figure. From all equally oriented filter sectors their pipes 5 (FIG. 1) lead down to corresponding channels 7 in the shaft and the channels have in this embodiment preferably a cross section in the form of a truncated circle sector. Near the shaft end each channel is curved opposite to the rotation direction of the shaft to such a degree that the curved channel 18 at the shaft end can be connected to its fall pipe 8 at a point chosen such that desired position for the fall pipe and its outlet is obtained.

From a manufacturing point of view it is appropriate to curve the channel as little as possible but a curving of at least 15 degrees is required in order to obtain a required effect. The larger the dimension of the fall pipes the larger curving angle which is required, and an angle of up to 120 degrees can be achieved. There is an optimum of about 30-90 degrees, preferably 30-75 degrees, depending on the application.

This embodiment can also be provided with pre-filtrate outlets 10 with closure device 13 and ending in a funnel 11.

FIG. 9 illustrates schematically the filtration process in an embodiment according to the invention, in which channels and fall pipes are arranged as shown in FIG. 8. The above description for the filtration process in the embodiment according to FIGS. 5-7 is principally also in this embodiment valid.

In the described embodiments according to FIGS. 5-7 and 9 the inclination of the fall pipe $8^{10}$ relative to the horizontal plane, when the jets of the removing spray hit the sector in position $4^{10}$, will be dependent on the construction of the filter and to which application the filter is intended, i.e. if high dry content of the filter cake is pursued, if the filter cake is difficult to remove, if the hydraulic capacity of the filter shall be high, etc. However, it has been proved that an inclination diverging maximum 45 degrees from the horizontal plane covers the applications that can be of concern.

The embodiments having besides the fall pipe a further outlet, pre-filtrate outlet, from each filter section are particularly favourable upon cleaning of backwater within cellulose and paper industries by the fact that, quite contrary to what otherwise is the case in this type of filters having co-rotating fall pipes, filtrate is not accumulated in the filter channels but the filtrate flows through the filter very rapidly which favourably effects the possibilities of taking out as large part clear filtrate as possible. Moreover, the embodiments having pre-filtrate outlets are favourable upon dewatering and thickening of suspensions, which are easy drained or exist at low concentration and hereby give a relatively large flow, by the fact the largest possible part of the filtration cycle is used for drainage of the filter. When using suspensions, which give a relatively low flow either owing to large filtration resistance or owing to relatively high concentration, it can on the other hand be favourable to use the pre-filtrate outlets only in limited extent or not at all, but allow a portion of the filtrate to be accumulated in the filter channels during the initial period of the filtration cycle until respective rotating fall pipe comes into position for its function. In these cases, the possibility obtained by the invention to make the fall pipe longer than what is possible in previously known filter construction of this kind is of great value.

The dimension of the fall pipe must be adapted to the total volume of the filter sectors so that the pipe during the emptying always is filled but yet manages to empty during the half revolution the emptying shall takes place. The length of the fall pipe determines proportionately the negative pressure it creates. For practical reasons the length should however need to be limited to about double the radius of the filter.

In order to improve still more the creation of negative pressure of the fall pipe it is suitable to provide its outlet with a diffusor having an angle below 20 degrees, whereby the pressure drop at the outflow is decreased.

Below the outlet of the fall pipes along the lower half of the filter casing a gutter can be positioned for catching the filtrate for further transport and use.

Above has been described how the filtrate is drained out at one shaft end of the filter. It is, however, possible within the frame of the invention to arrange drainage at both shaft ends of the filter. It is within the frame of the invention furthermore possible to let the pre-filtrate outlets extend out through one shaft end of the filter and let clear filtrate outlets with co-rotating fall pipes extend out from the other shaft end.

Moreover, it is not necessary to arrange pre-filtrate outlets to all disc sectors, even if hereby the capacity of the filter can be somewhat lower.

A filter according to the invention is not limited to be used only within cellulose and paper industries, but can also be used in other applications where filters of this kind can be proved to be usable.

I claim:

1. A rotating disc filter for dewatering a suspension, comprising:
    a hollow, horizontal filter shaft;
    at least one filter disc radially arranged on said filter shaft, said filter disc being divided into a plurality of disc sectors and being provided with means for removing a filter cake formed on the filter disc;

at least one filtrate channel extending from each disc sector along said filter shaft to at least one of the end sides of the disc filter; and means for generating a negative pressure in said filter disc consisting essentially of:

a plurality of fall pipes communicating with the filtrate channels at said one side end of the disc filter for generating the negative pressure in the interior of the disc sectors, said fall pipes being in fluid flow communication with said filtrate channels and rotatable therewith and extending in substantially a radial direction relative to the filter shaft.

2. A disc filter according to claim 1, wherein pre-filtrate outlets are connected to at least most of the disc sectors.

3. A disc filter according to claim 2, wherein the filtrate channels are at said one side end of the filter which are provided with said pre-filtrate outlets.

4. A disc filter according to claim 2 or 3, wherein said pre-filtrate outlets are provided with means for automatically stopping the flow of filtrate through said outlets.

5. A disc filter according to claim 1, wherein the outlet of each fall pipe, when the disc sector related thereto reaches said means for removing the filter cake, is positioned a maximum of 20 degrees of the rotation revolution above a horizontal line from the lowest point on the filter surface of the related disc sector and a maximum of 40 degrees of the rotation revolution below said line.

6. A disc filter according to claim 1, wherein the radial direction of each fall pipe, when the related disc filter reaches said means for removing the filter cake, differs a maximum of 45 degrees from the horizontal position.

7. A disc filter according to claim 1, wherein the connection of each filtrate channel to the fall pipe corresponding thereto is displaced 15-120 degrees after the related disc sector seen in the direction of the filter rotation.

8. A disc filter according to claim 7, wherein said displacement range is 30-75 degrees.

9. A disc filter according to claim 1, wherein the outlet of each fall pipe is positioned outside the outer periphery of the filter disc.

10. A disc filter according to claim 1, wherein the outlet of each fall pipe is formed as a diffusor having an angle below 20 degrees.

* * * * *